US012333099B2

(12) United States Patent
Inoue et al.

(10) Patent No.: US 12,333,099 B2
(45) Date of Patent: Jun. 17, 2025

(54) OPTICAL FILM, LAMINATED FILM, AND TOUCH PANEL

(71) Applicant: FUJIFILM Corporation, Tokyo (JP)

(72) Inventors: Daisuke Inoue, Kanagawa (JP); Yu Isobe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1063 days.

(21) Appl. No.: 17/196,496

(22) Filed: Mar. 9, 2021

(65) Prior Publication Data

US 2021/0200348 A1 Jul. 1, 2021

Related U.S. Application Data

(63) Continuation of application No. PCT/JP2019/033848, filed on Aug. 29, 2019.

(30) Foreign Application Priority Data

Sep. 28, 2018 (JP) .................................. 2018-184339

(51) Int. Cl.
*B32B 7/12* (2006.01)
*B32B 7/023* (2019.01)
(Continued)

(52) U.S. Cl.
CPC .............. *G06F 3/041* (2013.01); *B32B 7/023* (2019.01); *B32B 7/12* (2013.01); *B32B 27/08* (2013.01);
(Continued)

(58) Field of Classification Search
CPC .......................... B32B 2457/208; B32B 27/18
See application file for complete search history.

(56) References Cited

U.S. PATENT DOCUMENTS

2004/0156110 A1* 8/2004 Ikeyama ................. B32B 27/18
359/603
2007/0086091 A1 4/2007 Sawanobori et al.
2012/0111231 A1 5/2012 Sueyoshi et al.

FOREIGN PATENT DOCUMENTS

JP 2007-114772 A 5/2007
JP 2013-014506 A 1/2013
(Continued)

OTHER PUBLICATIONS

Office Action, which was issued by the State Intellectual Property Office of China on Jun. 30, 2022, in connection with Chinese Patent Application No. 201980062687.2.
International Search Report Issued in PCT/JP2019/033848 on Oct. 8, 2019.
Written Opinion Issued in PCT/JP2019/033848 on Oct. 8, 2019.
(Continued)

*Primary Examiner* — William P Watkins, III
(74) *Attorney, Agent, or Firm* — Edwards Neils LLC; Jean C. Edwards, Esq.

(57) ABSTRACT

An optical film includes a substrate film and an adhesion-facilitating layer arranged on at least one surface of the substrate film, in which the adhesion-facilitating layer contains a resin, silica particles, and metal oxide particles other than the silica particles; a ratio of a percentage A of an area derived from the metal oxide particles in a total area of a specific lower region to a percentage B of an area derived from the metal oxide particles in a total area of a specific upper region is 1.05 or more; and the surface of the adhesion-facilitating layer opposite to the substrate film side has an arithmetic mean roughness Ra of 10 nm or more and less than 20 nm.

17 Claims, 1 Drawing Sheet

(51) Int. Cl.
    *B32B 27/08*    (2006.01)
    *B32B 27/18*    (2006.01)
    *B32B 27/36*    (2006.01)
    *G06F 3/041*    (2006.01)
    *H01B 5/14*     (2006.01)

(52) U.S. Cl.
    CPC .............. *B32B 27/18* (2013.01); *B32B 27/36* (2013.01); *H01B 5/14* (2013.01); *B32B 2255/26* (2013.01); *B32B 2264/1021* (2020.08); *B32B 2264/1024* (2020.08); *B32B 2307/538* (2013.01); *B32B 2457/208* (2013.01)

(56)            References Cited

FOREIGN PATENT DOCUMENTS

JP        2016-187929 A      11/2016
JP        2017-109369 A       6/2017

OTHER PUBLICATIONS

International Preliminary Report on Patentability Issued in PCT/JP2019/033848 on Mar. 23, 2021.
Office Action, issued by the Japanese Patent Office on Dec. 14, 2021, in connection with Japanese Patent Application No. 2020-548238.
Office Action, which was issued by the State Intellectual Property Office of China on Sep. 9, 2022, in connection with Chinese Patent Application No. 201980062687.2.

* cited by examiner

OPTICAL FILM, LAMINATED FILM, AND TOUCH PANEL

CROSS-REFERENCE TO RELATED APPLICATIONS

This application is a Continuation of PCT International Application No. PCT/JP2019/033848 filed on Aug. 29, 2019, which was published under PCT Article 21(2) in Japanese, and which claims priority under 35 U.S.C § 119(a) to Japanese Patent Application No. 2018-184339 filed on Sep. 28, 2018. The above applications are hereby expressly incorporated by reference, in their entirety, into the present application.

BACKGROUND OF THE INVENTION

1. Field of the Invention

The present invention relates to an optical film, a laminated film, and a touch panel.

2. Description of the Related Art

An optical film having an adhesion-facilitating layer is applied in various applications JP2016-187929A discloses an aspect in which a conductive layer is formed on an adhesion-facilitating layer of an optical film having a polyester film and an adhesion-facilitating layer (optical film). In addition, JP2016-187929A discloses that the manufactured conductive film can be applied to a touch panel.

SUMMARY OF THE INVENTION

On the other hand, in recent years, in a case where a touch panel including a conductive film is applied to a display device, there has been a problem that the display device looks whitish to an observer in a case where the display device is not lit. In other words, there has been a problem that blackness of a screen is insufficient. Hereinafter, in a case where a display device to which a film (for example, a conductive film) is applied is displayed in black, whitishness is suppressed and blackness is strong, which is referred to as "good blackness".

The present inventors prepared a film (for example, a conductive film) using the optical film including a polyester film and an adhesion-facilitating layer, which is disclosed in JP2016-187929A, arranged the thus-prepared film on a display device, and then examined characteristics thereof. As a result, it was found that the blackness was insufficient.

In addition, in an optical film including an adhesion-facilitating layer, it is also required that the layer arranged on the adhesion-facilitating layer has excellent adhesiveness.

Further, the optical film including an adhesion-facilitating layer is also required to have good slipperiness from the viewpoint of suppressing the occurrence of wrinkles or the like.

The present invention has been made in view of the above-mentioned circumstances, and an object thereof is to provide an optical film including an adhesion-facilitating layer, which is capable of forming a film that can give good blackness in a case of being applied to a display device, has excellent adhesiveness of the layer arranged on the adhesion-facilitating layer, and has excellent slipperiness.

Another object of the present invention is to provide a laminated film and a touch panel, each of which including the optical film.

As a result of extensive studies on the above-mentioned problems, the present inventors have found that the foregoing objects can be achieved by the following configuration.

(1) An optical film comprising:
a substrate film; and
an adhesion-facilitating layer arranged on at least one surface of the substrate film,
in which the adhesion-facilitating layer contains a resin, silica particles, and metal oxide particles other than the silica particles;
in a case where an average film thickness of the adhesion-facilitating layer in a vertical cross section thereof is calculated, a region to a height corresponding to 50% of an average film thickness from a substrate film side of the adhesion-facilitating layer is defined as a lower region, and a region excluding the lower region of the adhesion-facilitating layer is defined as an upper region, a ratio of a percentage A of an area derived from the metal oxide particles in a total area of the lower region to a percentage B of an area derived from the metal oxide particles in a total area of the upper region is 1.05 or more; and
the surface of the adhesion-facilitating layer opposite to the substrate film side has an arithmetic mean roughness Ra of 10 nm or more and less than 20 nm.

(2) The optical film according to (1), in which the percentage A is 80% or more.

(3) The optical film according to (1) or (2), in which a percentage D of an area derived from the silica particles in a total area of the upper region is larger than a percentage C of an area derived from the silica particles in a total area of the lower region.

(4) The optical film according to (3), in which a ratio of the percentage D to the percentage C is 2.0 or more.

(5) The optical film according to (3) or (4), in which the percentage D is 8% or more.

(6) The optical film according to any one of (1) to (5), in which the adhesion-facilitating layer has a refractive index of 1.56 to 1.60.

(7) The optical film according to any one of (1) to (6), in which the adhesion-facilitating layer has an average film thickness of more than 80 nm and less than 120 nm (8) The optical film according to any one of (1) to (7), in which the metal oxide particles have an average particle size of 10 nm or less.

(9) The optical film according to any one of (1) to (8), in which a metal atom contained in the metal oxide particles is one selected from the group consisting of zirconium and titanium.

(10) The optical film according to any one of (1) to (9), in which the metal oxide particles are not subjected to a surface treatment

(11) The optical film according to any one of (1) to (10), in which the silica particles have an average particle size of 50 to 120 nm.

(12) The optical film according to any one of (1) to (11), in which a mass ratio of the metal oxide particles to the silica particles is 8.5 to 11.0.

(13) The optical film according to any one of (1) to (12), in which the adhesion-facilitating layer contains at least one resin selected from the group consisting of an acrylic resin, a methacrylic resin, and a polyester resin.

(14) A laminated film comprising:
the optical film according to any one of (1) to (13); and
a resin layer arranged on an adhesion-facilitating layer of the optical film.

(15) The laminated film according to (14), in which the resin layer contains an acrylic resin or a methacrylic resin.

(16) The laminated film according to (14) or (15), in which the resin layer contains a metal component.

(17) The laminated film according to any one of (14) to (16), in which the metal component constitutes a thin metal wire.

(18) A touch panel comprising:
the laminated film according to any one of (14) to (17).

According to an aspect of the present invention, it is possible to provide an optical film including an adhesion-facilitating layer, which is capable of forming a film that can give good blackness in a case of being applied to a display device, has excellent adhesiveness of the layer arranged on the adhesion-facilitating layer, and has excellent slipperiness.

In addition, according to the aspect of the present invention, it is possible to provide a laminated film and a touch panel, each of which including the optical film.

DESCRIPTION OF THE PREFERRED EMBODIMENTS

Figure 1:
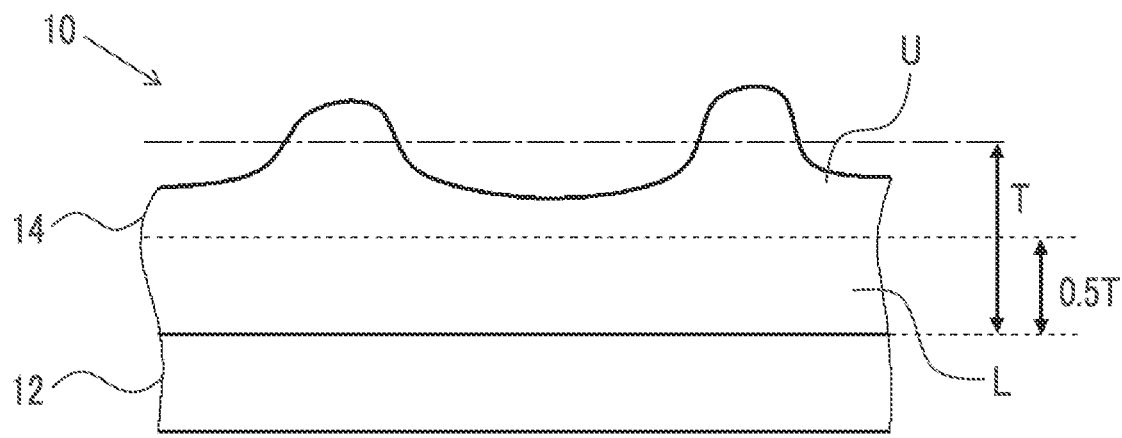
FIG. 1 is a view for explaining a method of calculating a percentage of an area derived from each component in a vertical cross section of an adhesion-facilitating layer.

Hereinafter, suitable embodiments of the present invention will be described. Any numerical range expressed using "to" in the present specification refers to a range including the numerical values before and after the "to" as a lower limit value and an upper limit value, respectively.

With regard to the features of the optical film according to an embodiment of the present invention, it can be mentioned that the present inventors have found that the adhesiveness of a layer (for example, a conductive layer) (hereinafter, also simply referred to as "adhesiveness") arranged on an adhesion-facilitating layer, the blackness, and the slipperiness can be improved by controlling the dispersed state of metal oxide particles other than silica particles in the adhesion-facilitating layer and adjusting the surface roughness of the adhesion-facilitating layer.

In addition, in a case where a conductive layer (for example, a resin layer containing a metal component) is arranged on the adhesion-facilitating layer of the optical film according to the embodiment of the present invention, it also has a feature that migration between the conductive portions in the layer does not easily proceed. It should be noted that the fact that the migration does not easily proceed is said to be excellent in migration resistance.

The optical film according to the embodiment of the present invention includes a substrate film and an adhesion-facilitating layer arranged on at least one surface of the substrate film.

Hereinafter, individual members included in the optical film will be described in detail
<Substrate Film>

The optical film includes a substrate film.

The type of resin constituting the substrate film is not particularly limited, and examples thereof include a polyester resin, a polyolefin resin, a cyclic olefin resin, an acrylic resin, a methacrylic resin, and a polyimide resin, among which a polyester resin is preferable. The refractive index of the substrate film is preferably 1.61 or more and more preferably 1.64 or more. The upper limit of the refractive index is preferably 1.69 or less and more preferably 1.68 or less.

A biaxially stretched polyester film is preferable as the substrate film.

The biaxially stretched polyester film is a polyester film stretched in to directions (machine direction and horizontal direction). The polyester film to be stretched (unstretched polyester film) may be, for example, a polyester film extruded by a so-called extrusion method, which is melt-extruded from an extrusion die. More specifically, the unstretched polyester film may be, for example, a polyester film obtained in such a manner that polyester as a raw material is supplied to a known melt extruder, extruded into a sheet from a slit-shaped die, closely attached to a casting drum by a method such as electrostatic application, and then cooled and solidified.

The polyester contained in the biaxially stretched polyester film may be, for example, a polyester obtained by polycondensation of an aromatic dicarboxylic acid with an aliphatic glycol.

Examples of the aromatic dicarboxylic acid include terephthalic acid, isophthalic acid, and 2,6-naphthalenedicarboxylic acid.

Examples of the aliphatic glycol include ethylene glycol, diethylene glycol, trimethylene glycol, tetramethylene glycol, neopentyl glycol, and 1,4-cyclohexanedimethanol.

Examples of the polyester include polyethylene terephthalate (PET), polyethylene-2,6-naphthalene dicarboxylate, and polybutylene terephthalate.

The thickness of the substrate film is not particularly limited, and is preferably 20 to 100 Wm, more preferably 20 to 80 μm, and still more preferably 30 to 50 μm.

The substrate film may contain various additives (for example, an antioxidant, an ultraviolet absorber, a lubricant, and an antistatic agent), if necessary.

In addition, the substrate film may be subjected to a surface activation treatment, such as a chemical treatment, a mechanical treatment, a corona discharge treatment, a flame treatment, an ultraviolet treatment, a high frequency treatment, a glow discharge treatment, an active plasma treatment, a laser treatment, a mixed acid treatment, or an ozone acid treatment. in advance for the purpose of firmly adhering each layer to the substrate film.
<Adhesion-Facilitating Layer>

The adhesion-facilitating layer is a layer arranged on at least one surface of the above-mentioned substrate film. The adhesion-facilitating layer may be arranged on both surfaces of the substrate film. In addition, the adhesion-facilitating layer is preferably arranged adjacent to the substrate film.

As will be described later, it is preferable that a conductive layer is arranged on the surface of the adhesion-facilitating layer opposite to the substrate film side Hereinafter, first, individual components contained in the adhesion-facilitating layer will be described in detail.
(Resin)

The adhesion-facilitating layer contains a resin.

The type of resin is not particularly limited, and examples thereof include an acrylic resin, a methacrylic resin, a polyester resin, a urethane resin, and a polyolefin resin Among them, an acrylic resin, a methacrylic resin, or a polyester resin is preferable from the viewpoint that at least one of blackness, adhesiveness, or slipperiness is improved (hereinafter, it is also referred to as the "viewpoint that the effect of the present invention is more excellent").

The adhesion-facilitating layer may contain only one type of resin or may contain a plurality of types of resins. Above all, the adhesion-facilitating layer preferably contains a plurality of types of resins, and preferably contains at least one of an acrylic resin or a methacrylic resin and a polyester resin, from the viewpoint that the effect of the present invention is more excellent.

In a case where at least one of an acrylic resin or a methacrylic resin and a polyester resin are contained in the adhesion-facilitating laser, a percentage of the mass of the polyester resin to the total mass of the acrylic resin, the methacrylic resin, and the polyester resin {(mass of polyester resin/total mass of acrylic resin, methacrylic resin, and polyester resin)×100} is preferably 30% to 60% and more preferably 40% to 55%.

For example, in a case where the acrylic resin and the polyester resin are contained in the adhesion-facilitating layer and the methacrylic resin is not contained therein, the mass of the methacrylic resin is considered to be 0 in the calculation of the above percentage, and therefore the above percentage is calculated by {(mass of polyester resin/total mass of acrylic resin and polyester resin)×100}.

The content of the resin in the adhesion-facilitating layer is not particularly limited, but is preferably 50% to 100% by mass and more preferably 60% to 99% by mass with respect to the total mass of the adhesion-facilitating layer, from the viewpoint that the adhesiveness of the adhesion-facilitating layer is more excellent.

(Silica Particles)

The adhesion-facilitating layer contains silica particles.

The average particle size of the silica particles is not particularly limited, but is preferably 30 to 130 nm and more preferably 50 to 120 nm, from the viewpoint that the effect of the present invention is more excellent.

The average particle size of the silica particles is obtained by, for example, measuring particle sizes (equivalent circle diameters) of 100 silica particles randomly selected from an image taken with a microscope (for example, a scanning electron microscope) and arithmetically averaging the measured values. The equivalent circle diameter is a diameter of a circle assuming a perfect circle having the same projected area as the projected area of the particles at the time of observation.

The content of the silica particles in the adhesion-facilitating layer is not particularly limited, but is preferably 0.1% to 5% by mass and more preferably 1% to 3% by mass with respect to the total mass of the adhesion-facilitating layer, from the viewpoint that the effect of the present invention is more excellent.

(Metal Oxide Particles Other than Silica Particles)

The adhesion-facilitating layer contains metal oxide particles (hereinafter, also simply referred to as "specific particles") other than the silica particles.

The type of metal atom contained in the specific particle may be other than silicon atom, and examples thereof include zirconium, titanium, vanadium, hafnium, and aluminum. Of these, zirconium or titanium is preferable from the viewpoint that the effect of the present invention is more excellent.

The surface of the specific particles may or may not be subjected to a surface treatment. Above all, the specific particles are preferably specific particles that have not been subjected to a surface treatment, from the viewpoint that the effect of the present invention is more excellent.

Examples of the surface treatment include a surface treatment with a silane coupling agent and a surface treatment with a dispersant.

The average particle size of the specific particles is not particularly limited, but is preferably 50 nm or less and more preferably 10 nm or less and is preferably 1 nm or more and more preferably 2 nm or more, from the viewpoint that the effect of the present invention is more excellent.

The average particle size of the specific particles is obtained by, for example, measuring particle sizes (equivalent circle diameters) of 100 specific particles randomly selected from an image taken with a microscope (for example, a transmission electron microscope) and arithmetically averaging the measured values. The equivalent circle diameter is a diameter of a circle assuming a perfect circle having the same projected area as the projected area of the particles at the time of observation.

The content (% by mass) of the specific particles in the adhesion-facilitating layer is not particularly limited, but is preferably 10.0% to 30.0% by mass and more preferably 15.0% to 20.0% by mass with respect to the total mass of the adhesion-facilitating layer, from the viewpoint that the effect of the present invention is more excellent and from the viewpoint that a conductive film having more excellent migration resistance can be obtained.

In addition, the content (% by volume) of the specific particles in the adhesion-facilitating layer is not particularly limited, but is preferably 1.0% to 10.0% by volume, more preferably 2.0% to 6.0% by volume, and still more preferably 3.0% to 6.0% by volume with respect to the total volume of the adhesion-facilitating layer, from the viewpoint that the effect of the present invention is more excellent and from the viewpoint that a conductive film having more excellent migration resistance can be obtained.

The mass ratio of the specific particles to the silica particles (mass of specific particles/silica particles) is not particularly limited, but is preferably 8.5 to 11.0 from the viewpoint that the effect of the present invention is more excellent, and more preferably 9.0 to 11.0 from the viewpoint that a conductive film having more excellent migration resistance can be obtained.

The adhesion-facilitating layer may contain components other than the above-mentioned components.

For example, the adhesion-facilitating layer may contain a surfactant. The use of a surfactant facilitates uniform placement of the adhesion-facilitating layer on the substrate film.

The content of the surfactant contained in the adhesion-facilitating layer is preferably 0.01% to 5.0% by mass with respect to the total mass of the adhesion-facilitating layer.

The surfactants may be used alone or in combination of two or more thereof.

The type of surfactant is not particularly limited, and examples thereof include known surfactants. Examples of the surfactant include an ionic surfactant (an anionic surfactant, a cationic surfactant, or an amphoteric surfactant) and a nonionic water-soluble surfactant (a nonionic surfactant, a silicone-based surfactant, or a fluorine-based surfactant), among which an ionic surfactant is preferable and an anionic surfactant is more preferable, from the viewpoint that the surface properties of the adhesion-facilitating layer are more excellent. In addition, an anionic surfactant and a nonionic surfactant may be used in combination.

The adhesion-facilitating layer may contain other components such as a film-forming aid, a slipping agent, an antifoaming agent, a foam inhibitor, a dye, a fluorescent whitening agent, a preservative, a water resistant additive, and an antistatic agent, if necessary.

(Characteristics of Adhesion-Facilitating Layer)

The average film thickness of the adhesion-facilitating layer is not particularly limited, but is preferably 50 to 140 nm, more preferably 80 to 120 nm, still more preferably more than 80 nm and less than 120 nm, and particularly preferably 90 to 110 nm, from the viewpoint that the effect of the present invention is more excellent.

The average film thickness is obtained by measuring thicknesses of the adhesion-facilitating layer at any five or more positions and arithmetically averaging the measured values.

The refractive index of the adhesion-facilitating layer is not particularly limited, but is preferably 1.56 to 1.60. Above all, the refractive index of the adhesion-facilitating layer is more preferably 1.57 to 1.59, from the viewpoint that the blackness becomes better.

The refractive index is a value at a wavelength of 589 nm.

A method for measuring the refractive index is as follows.

Using a sodium lamp (Na-D line) as a light source, methylene iodide as a mount solution, and an Abbe refractometer (NAR-4T, manufactured by Atago Co., Ltd.) at a temperature of 23'C and a relative humidity of 65%, the refractive indexes in two orthogonal directions (for example, the longitudinal direction and the width direction) are measured, and then the measured values are arithmetically averaged to obtain the above-mentioned refractive index.

The adhesion-facilitating layer preferably has a convex portion derived from silica particles on the surface opposite to the substrate film side.

A method for measuring the convex portion is as follows. The adhesion-facilitating layer is cut by a method such as microtome or focused ion beam (FIB, with Ga ions) to obtain a cross section thereof. The cross section is observed with a scanning microscope (SEM), and on the surface of the adhesion-facilitating layer opposite to the substrate film side, a composition analysis with energy dispersive X-ray spectroscopy (EDX) is carried out on a portion that is convex from the average film thickness (a portion thicker than the average film thickness). In a case here a component (for example, a silicon atom) derived from silica particles can be confirmed, it is determined that the portion is a convex portion derived from the silica particles.

In a case where an average film thickness of the adhesion-facilitating layer in a vertical cross section thereof is calculated, a region to a height corresponding to 50% of an average film thickness from a substrate film side of the adhesion-facilitating layer is defined as a lower region, and a region excluding the lower region of the adhesion-facilitating layer is defined as an upper region, a ratio of a percentage A of an area derived from specific particles in a total area of the lower region to a percentage B of an area derived from specific particles in a total area of the upper region (percentage A/percentage B) is 1.05 or more.

Hereinafter, the calculation method of the above definition will be described in detail with reference to the drawings.

FIG. 1 is a vertical cross section of an optical film 10, in which the optical film 10 includes a substrate film 12 and an adhesion-facilitating layer 14. Although not shown in FIG. 1, cross sections of silica particles and specific particles are observed in a vertical cross section of the adhesion-facilitating layer 14.

A method of cutting the optical film at a predetermined position thereof can be mentioned as the method for obtaining the vertical cross section of the optical film. The cutting method is not particularly limited and may be, for example, a method such as microtome or FIB. At the time of the cutting, it is preferable to cut the optical film at a position where specific particles in the adhesion-facilitating layer are cut.

Next, the average film thickness of the adhesion-facilitating layer 14 is calculated. The method for calculating the average film thickness is as described above. In FIG. 1, the height corresponding to the average film thickness is represented by an alternate long and short dash line. Next, the region to a height corresponding to 50% of the average film thickness from the substrate film side of the adhesion-facilitating layer is defined as a lower region. In FIG. 1, the region to a height corresponding to 50% of the average film thickness from the substrate film side of the adhesive laser is a lower region L which is defined as the region between the surface of the substrate film 12 and the broken line located at a height (0.5 T) corresponding to 50% of the average film thickness. Then, a region other than the lower region of the adhesion-facilitating layer is defined as an upper region. In FIG. 1, a region other than the lower region L of the adhesion-facilitating layer 14 is defined as an upper region U.

The ratio of a percentage A of an area derived from specific particles in a total area of the lower region to a percentage B of an area derived from specific particles in a total area of the upper region (percentage A/percentage B) is 1.05 or more, and from the viewpoint that the effect of the present invention is more excellent, it is preferably 1.09 or more. The upper limit of percentage A/percentage B is not particularly limited, but is preferably 1.60 or less.

The percentage A is preferably 80% or more and more preferably 83% or more, from the viewpoint that the effect of the present invention is more excellent. The upper limit of the percentage A is preferably 90% or less from the viewpoint that the adhesiveness between the adhesion-facilitating layer and the substrate film is more excellent.

In addition, the percentage B is preferably less than 804, and more preferably 77% or less, from the viewpoint that the effect of the present invention is more excellent. The lower limit of the percentage B is not particularly limited, but is preferably 50% or more and more preferably 60% or more.

In addition, from the viewpoint that the effect of the present invention is more excellent, a percentage D of an area derived from silica particles in a total area of the upper region is preferably larger than a percentage C of an area derived from silica particles in a total area of the lower region.

In addition, from the viewpoint that the effect of the present invention is more excellent, the ratio of the percentage D to the percentage C (percentage D/percentage C) is preferably 2.0 or more and more preferably 3.0 or more. The upper limit of percentage D/percentage C is not particularly limited, but is preferably 20.0 or less.

The percentage C is preferably 1% or more and more preferably 2% or more, from the viewpoint that the effect of the present invention is more excellent. The upper limit of the percentage C is not particularly limited, but is preferably 5% or less and more preferably 4% or less.

In addition, the percentage D is preferably 8% or more and more preferably 9% or more, from the viewpoint that the effect of the present invention is more excellent. The upper limit of the percentage D is not particularly limited, but is preferably 20% or less and more preferably 15% or less.

The calculation method of the percentage A to the percentage D is as follows.

The vertical cross section of the obtained optical film is observed by imaging a continuous portion having a width (length direction of the substrate film) of about 4 μm in one field of view with a scanning electron microscope for a total of ten fields of view. The values, which are obtained by obtaining the percentage of the area derived from each component in the total area of the lower region and the percentage of the area derived from each component in the total area of the upper region, in each of the obtained fields of view, and then arithmetically averaging the obtained percentage values, correspond to the percentage A to the percentage D, respectively. For example, the value obtained by calculating the percentages (%) of the areas derived from specific particles in the total areas of individual lower regions in ten fields of view are calculated, and then arithmetically averaging the calculated percentages corresponds to the percentage A (%). The area derived from each component corresponds to an area of a region w here each component appearing in the vertical cross section of the optical film is located. For example, the area derived from specific particles represents an area of a region where the specific particles are located in the vertical cross section of the optical film.

In the observation diagram of one field of view, the optical film is imaged such that the film can be seen from one end to the other in a width direction of the observation diagram, and the length is then adjusted to be about 4 μm.

In the vertical cross section, each component can be identified by EDX in combination with a scanning electron microscope.

The arithmetic mean roughness Ra of the surface of the adhesion-facilitating layer opposite to the substrate film side is 10 nm or more and less than 20 nm. Above all, the arithmetic mean roughness Ra is preferably 19 nm or less and more preferably 16 nm or less and is particularly preferably 12 nm or more, from the viewpoint that the effect of the present invention is more excellent.

As a method for measuring the arithmetic mean roughness Ra, data (three-dimensional data) is acquired by observing the surface of the adhesion-facilitating layer opposite to the substrate film side using a laser microscope (laser microscope VK-X200 manufactured by Keyence Corporation). The measurement conditions are as follows.

Objective lens magnification 50× shooting size: 1024× 768

Next, using the attached data processing software, the distortion of the entire image is corrected by tilt correction, and Ra having a length of 4 μm is calculated. The measurement was carried out at 10 different positions of the adhesion-facilitating layer in each sample, and a value obtained by arithmetically averaging the measured values is defined as the above-mentioned "arithmetic mean roughness Ra of the surface of the adhesion-facilitating layer opposite to the substrate film side".

<Method for Producing Optical Film>

The method for producing an optical film is not particularly limited, and a known method can be adopted.

Examples of the method for producing an optical film include a method in which a composition for forming an adhesion-facilitating layer is applied onto a polyester film stretched in one direction of a transport direction (MD direction) and a direction (TD direction) orthogonal to the transport direction to form a coating film, and the obtained film with a coating film is stretched in the other direction of the MD direction and the TD direction to obtain an optical film (hereinafter, also referred to as "method 1"): a method in which a composition for forming an adhesion-facilitating layer is applied onto an unstretched polyester film to form a coating film, and the obtained film with a coating film is biaxially stretched to obtain an optical film (hereinafter, also referred to as "method 2"); a method in which a composition for forming an adhesion-facilitating layer is applied onto a biaxially stretched polyester film to form a coating film, and the obtained coating film is subjected to various surface treatments (for example, an embossing treatment, a laser processing treatment, and an etching treatment) to obtain an optical film; and a method in which a composition for forming an adhesion-facilitating layer containing a predetermined surface tension adjuster is applied onto a biaxially stretched polyester film to form a coating film to thereby form a predetermined adhesion-facilitating layer Above all, the method for producing an optical film is preferably the method 1 or the method 2, more preferably the method 1, and still more preferably the method 1 in which a composition for forming an adhesion-facilitating layer is applied onto a polyester film stretched in an MD direction, from the viewpoint of easy production.

Hereinafter, the method 1 in which a composition for forming an adhesion-facilitating layer is applied onto a polyester film stretched in an MD direction will be described in detail.

One of the suitable embodiments of the composition for forming an adhesion-facilitating layer used in the method 1 may be, for example, a composition for forming an adhesion-facilitating layer containing the above-mentioned resin, silica particles, and specific particles. The composition for forming an adhesion-facilitating layer may further contain other components that may be contained in the above-mentioned adhesion-facilitating layer.

In addition, the composition for forming an adhesion-facilitating layer may contain a solvent. Examples of the solvent include water and an organic solvent, both of which may be mixed and used. Examples of the organic solvent include alcohols such as methanol, ketones such as acetone, amides such as formamide, sulfoxides such as dimethyl sulfoxide, esters such as ethyl acetate, and ethers.

In addition, the composition for forming an adhesion-facilitating layer may contain a cross-linking agent. The cross-linking agent plays a role of cross-linking the resins. In a case where a cross-linking agent is used, the adhesion-facilitating layer formed has a cross-linked structure derived from the cross-linking agent (for example, a carbodiimide-based cross-linking agent or an oxazolidine-based cross-linking agent which will be described later).

The cross-linking agent is preferably an oxazoline-based cross-linking agent, a carbodiimide-based cross-linking agent, an epoxy-based cross-linking agent, an isocyanate-based cross-linking agent, or a melamine-based cross-linking agent ($C_3N_6H_6$), and more preferably a carbodiimide-based cross-linking agent or an oxazoline-based cross-linking agent.

The polyester film stretched in a transport direction onto which the composition for forming an adhesion-facilitating laser is applied is a polyester film obtained by stretching an unstretched film in the transport direction.

The method of applying the composition for forming an adhesion-facilitating layer onto the polyester film stretched in a transport direction is not particularly limited, and known coating methods such as a gravure coater and a bar coater can be mentioned.

The amount of the composition for forming an adhesion-facilitating layer applied is not particularly limited, and is appropriately adjusted so as to obtain, for example, an adhesion-facilitating layer having the above-mentioned thickness.

A coating film obtained after application of the composition may be subjected to a drying treatment in order to remove a solvent from the coating film, if necessary Examples of the drying treatment method include a heat treatment and an air drying treatment.

Next, the film coated with the coating film (film with coating film) is stretched in a TD direction to obtain an optical film.

In a case where the composition for forming an adhesion-facilitating layer contains a cross-linking agent, the stretched coating film may be subjected to a hardening treatment, if necessary, after the stretching treatment. The method of the hardening treatment is not particularly limited, but is preferably a heat treatment. The conditions of the heat treatment are not particularly limited, but the heating temperature is preferably 80° C. to 300° C. and the heating time is preferably 3 seconds to 5 minutes.

The method 1 may be carried out by a so-called roll-to-roll method.

As described above, specific particles that have not been subjected to a surface treatment (hereinafter, also referred to as "untreated particles") may be used as the specific particles. In a case where untreated particles are used, the untreated particles tend to aggregate in the coating film. In a case where the coating film containing such an aggregate of untreated particles is stretched, an aggregate portion is not stretched and an aggregate-free region is stretched, so a recess is likely to be formed on the surface of an adhesion-facilitating layer to be formed, and as a result, the adhesion-facilitating layer having the above-mentioned characteristics can be easily produced.

In the methods 1 and 2, the percentage of the area derived from each component in the above-mentioned vertical cross section and the arithmetic mean roughness of the surface can be adjusted by adjusting a stretching ratio and various conditions of a drying treatment.

<Use>

The optical film can be used for various purposes, an example of which may be an aspect which is used as a laminated film by arranging a resin layer on an adhesion-facilitating layer.

The resin contained in the resin layer is not particularly limited, and examples thereof include known resins. Examples of the resin include hydrophobic resins, which may be, for example, at least one resin selected from the group consisting of an acrylic resin, a methacrylic resin, a styrene resin, a polyolefin resin, a polyester resin, a polyurethane resin, a polyamide resin, a polycarbonate resin, a polydiene resin, an epoxy resin, a silicone resin, a cellulose polymer, and a chitosan polymer, or a copolymer consisting of monomers constituting these resins. Among them, an acrylic resin or a methacrylic resin is preferable from the viewpoint of more excellent adhesiveness to the adhesion-facilitating layer.

The refractive index of the resin layer is not particularly limited, and is preferably 1.48 to 1.52 from the viewpoint that the effect of the present invention is more excellent. The refractive index is a value at a wavelength of 589 nm.

The method for measuring the refractive index is the same as the method for measuring the refractive index of the adhesion-facilitating layer described above.

The resin layer may further contain a metal component. In a case where the resin layer contains a metal component, the resin layer becomes a layer exhibiting conductivity and therefore functions as a conductive layer.

The metal component may be a component containing a metal atom, and examples thereof include gold, silver, platinum, copper, nickel, palladium, and an alloy thereof. Among them, silver is preferable from the viewpoint of low resistance.

The laminated film has the above-mentioned optical film and a resin layer arranged on the adhesion-facilitating layer in the optical film. As described above, in a case where the resin layer functions as a conductive layer, the laminated film can be used as a conductive film. It is preferable that the conductive layer has high transparency. That is, the conductive layer is preferably a transparent conductive layer.

The arrangement position of the metal component in the resin layer is not particularly limited, and the metal component may be contained in the entire resin layer or may be arranged in a pattern.

The arrangement pattern of the metal component is not particularly limited, and is preferably a geometric figure that combines triangles such as regular triangles, isosceles triangles, and right triangles; quadrangles such as squares, rectangles, rhombuses, parallelograms, and trapezoids; (regular) n-sided polygons such as (regular) hexagons and (regular) octagons; circles, ellipses, stars, and the like, and more preferably a mesh shape. That is, it is preferable that the metal component in the resin layer constitutes a thin metal wire (conductive thin wire), and the thin metal wire is arranged in a mesh shape.

Figure 2:
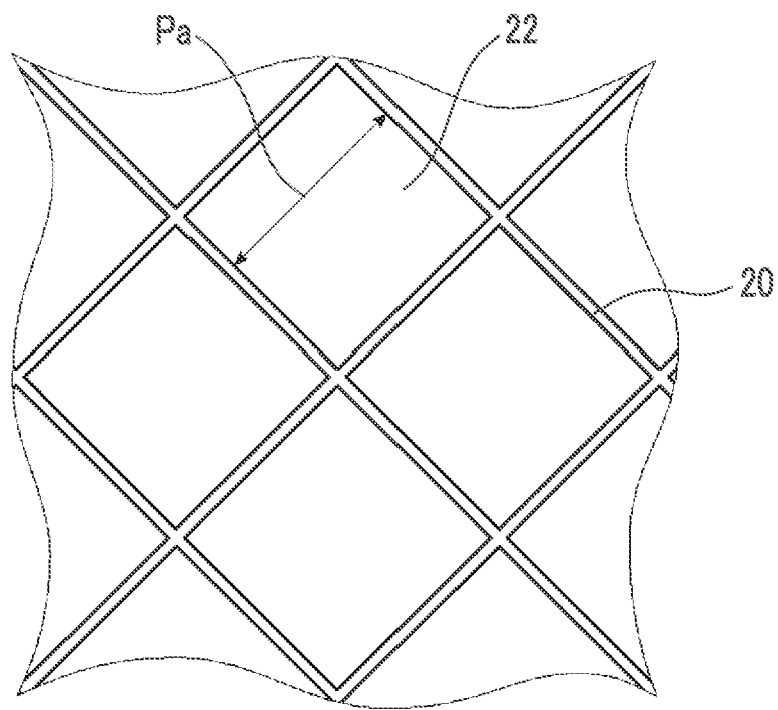
FIG. 2 is a partial plan view showing one form of an arrangement position of a metal component.

As shown in FIG. 2, the mesh shape is intended to be a shape including a plurality of square lattices 22 composed of intersecting thin metal wires 20.

The line width of a thin metal wire 10 is not particularly limited, and is preferably 30 μm or less, more preferably 15 μm or less, still more preferably 10 μm or less, particularly preferably 9 μm or less, and most preferably 7 μm or less and is preferably (1.5 μm or more and more preferably 1.0 μm or more. In a case where the line width of the thin metal wire 10 is within the above range, a low resistance electrode can be formed relatively easily.

The length Pa of one side of the lattice 12 is not particularly limited, and is preferably 1500 μm or less, more preferably 1300 μm or less, and still more preferably 100) μm or less and is preferably 5 μm or more, more preferably 30 μm or more, and still more preferably 80 μm or more. In a case where the length of the side of the opening is within the above range, it is possible to further maintain good transparency, and the display can be visually recognized without any discomfort in a case where a laminated film is attached as a conductive film to a front surface of a display device.

From the viewpoint of visible light transmittance, an opening ratio of a conductive portion formed from the thin metal wire is preferably 85% or more, more preferably 90% or more, and still more preferably 95% or more. The opening ratio corresponds to a percentage of the region on the adhesion-facilitating layer excluding the region with thin metal wires with respect to the entire adhesion-facilitating layer.

The thickness of the resin layer containing a metal component is preferably 0.1 to 100.0 μm, more preferably 0.3 to 10.0 μm, and still more preferably 0.5 to 2.0 μm, from the viewpoint that the resin layer is uniformly laminated on the adhesion-facilitating layer.

The method for forming the resin layer containing a metal component is not particularly limited and may be, for example, a method using silver halide. Specifically, the method described in paragraphs [0056] to [0114] of JP2014-209332A can be mentioned.

The optical film and the laminated film (conductive film) according to the embodiment of the present invention can be suitably used for a touch panel.

The type of the touch panel having the optical film or the laminated film according to the embodiment of the present invention is not particularly limited and can be appropriately selected depending on the intended purpose. For example, a surface capacitive touch panel, a projected capacitive touch panel, and a resistive touch panel can be mentioned. The touch panel includes so-called touch sensor and touch pad.

The touch panel is applied to various display devices (such as a liquid crystal display device and an organic electroluminescence display de % ice).

EXAMPLES

Hereinafter, the present invention will be described in more detail with reference to Examples, but the present invention is not limited thereto.

Example 5

(Preparation of Composition 5 for Forming Adhesion-Facilitating Layer)

Individual components shown in Table 1 below were mixed to prepare a composition 5 for forming an adhesion-facilitating layer.

Specifically, distilled water was added to a stainless steel can, and then individual components were added thereto while stirring the liquid at 100 revolutions per minute (rpm) using a rotary type agitator "AJITER" (manufactured by Shimazaki Mixing Engineering Co., Ltd.). In a case of adding individual components, the components were added at intervals of 5 minutes After all the components were added, the mixture was stirred for 60 minutes.

The column "Company name" in Table 1 represents the company that sells each product.

In addition, the column "Concentration of solid contents of product [wt %]" represents a concentration of solid contents (% by mass) in each product.

Further, the column "Concentration of each component [wt %]" represents a concentration (% by mass) of each material (for example, an acrylic resin) with respect to the total mass of the composition 5 for forming an adhesion-facilitating layer.

(Preparation of Optical Film)

The PET raw material was supplied to an extruder whose heater temperature was set to 280° C. to 300° C. and melt-kneaded in the extruder. Next, the molten resin was discharged from a die onto a cooling roll electrostatically applied to obtain an unstretched polyester film.

The obtained polyester film was stretched in a transport direction thereof (longitudinal stretching).

Then, the composition 5 for forming an adhesion-facilitating layer was applied onto both surfaces of the stretched polyester film with a bar. Then, heat was applied to the polyester film coated with the composition 5 for forming an adhesion-facilitating layer at 170° C. for 5 seconds to dry the water. Next, the polyester film was stretched at a temperature of 140° C. in a direction orthogonal to the transport direction of the film, and then heat was applied at 240° C. for 8 seconds to heat-fix the film, whereby an optical film 5 in which a biaxially stretched polyester film and an adhesion-facilitating layer were laminated adjacent to each other was obtained. The stretching ratio (in TD direction) was 4.8 times. The thickness of the polyester film substrate after stretching was 38 μm. In addition, the refractive index of the polyester film substrate after biaxial stretching was 1.65.

(Preparation of Laminated Film)

The following liquid 2 and liquid 3 were added simultaneously in amounts corresponding to 90% of an entire amount of each thereof over 20 minutes to the following liquid 1 kept at 38° C. and pH 4.5 while stirring the liquid 1. As a result, nuclear particles having a size of 0.16 μm were formed. Subsequently, the following liquid 4 and liquid 5 were added over 8 minutes to the obtained solution, and the remaining 10% amount of each of the following liquid 2 and liquid 3 was further added over 2 minutes. As a result, the nuclear particles grew to a size of 0.21 μm. Further, 0.15 g of potassium iodide was added to the obtained solution which was then aged for 5 minutes to complete particle formation.

| Liquid 1: | |
|---|---|
| Water | 750 ml |
| Gelatin | 8.6 g |
| Sodium chloride | 3 g |
| 1,3-Dimethylimidazolidine-2-thione | 20 mg |

| Type of material | | Trade name | Company name | Concentration of solid contents of product [wt %] | Concentration of individual components [wt %] |
|---|---|---|---|---|---|
| Resin | Acrylic resin | AS-563A | Daicel FineChem Ltd. | 27.5 | 3.11 |
| | Polyester resin | PLASCOAT Z-690 | Goo Chemical Co., Ltd. | 25 | 2.87 |
| Silica particles | | SNOWTEX ZL | Nissan Chemical Industries, Ltd. | 40.5 | 0.15 |
| Metal oxide particles | | SZR-CW (zirconium oxide) | Sakai Chemical Industry Co., Ltd. | 30 | 1.4 |
| Cross-linking agent | | CARBODILITE V-02-12 | Nisshinbo Chemical Inc. | 10 | 1.07 |
| Slipping agent | | CELLOSOL 524 | Chukyo Yushi Co., Ltd. | 30 | 0.27 |
| Anionic surfactant | | RAPISOL A-90 | NOF Corporation | | 0.05 |
| Nonionic surfactant | | NAROACTY CL95 | Sanyo Chemical Industries, Ltd. | 100 | 0.07 |
| Distilled water | | — | — | — | 91.01 |

| | |
|---|---|
| Sodium benzenethiosulfonate | 10 mg |
| Citric acid | 0.7 g |
| Liquid 2: | |
| Water | 300 ml |
| Silver nitrate | 150 g |
| Liquid 3: | |
| Water | 300 ml |
| Sodium chloride | 38 g |
| Potassium bromide | 32 g |
| Potassium hexachloroiridate (III) (0.005% in 20% aqueous KCl solution) | 5 ml |
| Ammonium hexachlororbodate (0.001% in 20% aqueous NaCl solution) | 7 ml |
| Liquid 4: | |
| Water | 100 ml |
| Silver nitrate | 50 g |
| Liquid 5: | |
| Water | 100 ml |
| Sodium chloride | 13 g |
| Potassium bromide | 11 g |
| Yellow prussiate of potash | 5 mg |

This was followed by water washing using a flocculation method according to a conventional method. Specifically, the temperature of the solution obtained abo % e was lowered to 35° C. and the pH of the solution was lowered (to be in a range of pH 3.6±0.2) using sulfuric acid until silver halide precipitated Next, about 3 L of the supernatant was removed from the obtained solution (first water washing). Next, 3 L of distilled water was added to the solution from which the supernatant had been removed, and then sulfuric acid was added thereto until silver halide precipitated. 3 L of the supernatant was removed again from the obtained solution (second water washing). The same operation as the second water washing was repeated once more (third water washing) to complete the water washing and desalting steps. The emulsion after water washing and desalting was adjusted to have a pH of 6.4 and a pAg of 7.5, and then 2.5 g of gelatin. 10 mg of sodium benzenethiosulfonate. 3 mg of sodium benzenethiosulfinate, 15 mg of sodium thiosulfate, and 10 mg of chloroauric acid were added thereto, followed by chemosensitization at 55° C. so as to obtain the optimum sensitivity. Then, 100 mg of 1,3,3a,7-tetraazaindene as a stabilizer and 100 mg of PROXEL (trade name, manufactured by ICI Co., Ltd.) as a preservative were further added to the obtained emulsion. The finally obtained emulsion was an emulsion of cubic silver iodochlorobromide particles containing 0.08% by mole of silver iodide, 70% by mole of silver chloride and 30% by mole of silver bromide at a ratio of silver chloride and silver bromide, and having an average particle size of 0.20 μm and a coefficient of variation of 9%.

1,3,3a,7-tetraazaindene ($1.2 \times 10^{-4}$ mol/mol Ag), hydroquinone ($1.2/10^{-2}$ mol/mol Ag), citric acid ($3.0 \times 10^{-4}$ mol/mol Ag), 2,4-dichloro-6-hydroxy-1,3,5-triazine sodium salt (0.90 g/mol Ag), and a trace amount of a hardening agent % ere added to the emulsion, thereby obtaining a composition. The pH of the composition was then adjusted to 5.6 using citric acid.

A polymer latex containing a polymer represented by (P-1) shown below (hereinafter, also referred to as "polymer 1"), a dispersant consisting of dialkylphenyl PEO (PEO is an abbreviation for polyethylene oxide) sulfuric acid ester, and w ater (in which a ratio of the mass of the dispersant to the mass of the polymer 1 (mass of dispersant/mass of polymer 1, unit: g/g) is 0.02, and the solid content is 22% by mass) was added to the above composition such that a ratio of the mass of the polymer 1 to the total mass of the gelatin in the composition (mass of polymer/mass of gelatin, unit: g/g) was 0.25/1, whereby a polymer latex-containing composition was obtained. Here, in the polymer latex-containing composition, a ratio of the mass of gelatin to the mass of silver derived from silver halide (mass of gelatin/mass of silver derived from silver halide, unit: gig) was 0.11.

Further, EPOXY RESIN DY 022 (trade name, manufactured by Nagase ChemteX Corporation) was added as a cross-linking agent. The amount of the cross-linking agent added was adjusted such that the amount of the cross-linking agent in the silver halide-containing photosensitive layer which will be described later w as 0.09 g/m$^2$.

The composition for forming a photosensitive layer was prepared as described above.

The polymer 1 was synthesized with reference to JP3305459B and JP3754745B.

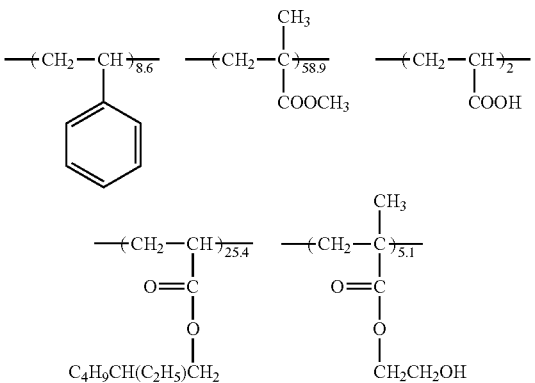

(P-1)

The polymer latex was applied onto the adhesion-facilitating layers arranged on both surfaces of the optical film 5 prepared above to provide undercoat layers having a thickness of 0.05 μm. This treatment was carried out in a roll-to-roll process, and each of the following treatments (steps) was also carried out roll-to-roll in the same manner.

Next, a composition for forming a silver halide-free layer in which the polymer latex and gelatin were mixed was applied onto the undercoat layer to provide a silver halide-free layer having a thickness of 1.0 μm. The mixed mass ratio of polymer 1 and gelatin (polymer 1/gelatin) was 2/1, and the content of the polymer 1 was 0.65 g/m$^2$.

Next, the composition for forming a photosensitive layer w % as applied onto the silver halide-free layer to provide a silver halide-containing photosensitive layer having a thickness of 2.5 μm. The mixed mass ratio of polymer 1 and gelatin (polymer 1/gelatin) in the silver halide-containing photosensitive layer w as 0.25/1, and the content of the polymer 1 was 0.19 g/m$^2$.

Next, a composition for forming a protective layer in which the polymer latex and gelatin were mixed was applied onto the silver halide-containing photosensitive layer to pros ide a protective layer having a thickness of 0.15 μm. The mixed mass ratio of polymer 1 and gelatin (polymer 1/gelatin) was 0.1/1, and the content of the polymer 1 was 0.015 g/m$^2$.

The photosensitive layer prepared above was exposed to light through a lattice-like photo mask using parallel light with a high-pressure mercury lamp as a light source. The mask for forming a pattern shown in FIG. 2 was used as the photo mask, in which the line width of the unit square lattice forming the lattice was 3.7 μm and the length Pa of one side of the lattice (opening) was 300 μm.

After exposure to light, the obtained sample was developed with a developer which will be described later, and further subjected to a development treatment using a fixing solution (trade name. N3X-R for CN16X, manufactured by Fujifilm Corporation) The sample was then rinsed with pure water at 25° C. and dried to obtain a sample A having a silver-containing layer in which metallic silver was formed in a mesh pattern.
(Composition of Developer)

The following compounds are contained in 1 L of the developer.

| | |
|---|---|
| Hydroquinone | 0.037 mol/L |
| N-methylaminophenol | 0.016 mol/L |
| Sodium metaborate | 0.140 mol/L |
| Sodium hydroxide | 0.360 mol/L |
| Sodium bromide | 0.031 mol/L |
| Potassium metabisulfite | 0.187 mol/L |

The sample A obtained above was immersed in warm water at 50° C. for 180 seconds. Thereafter, the sample A was drained with an air shower and allowed to air-dry.

The sample A was carried into a superheated steam treatment tank at 110° C. and allowed to stand for 30 seconds for superheated steam treatment. The steam flow rate at this time was 100 kg/h.

The superheated steam-treated sample A was immersed in an aqueous proteolytic enzyme solution (40° C.) for 120 seconds. The sample A was taken out from the aqueous proteolytic enzyme solution, and the sample A was immersed in warm water (liquid temperature 50° C.) for 120 seconds for washing Thereafter, the sample A was drained with an air shower and allowed to air-dry.

The aqueous proteolytic enzyme solution used was prepared according to the following procedure.

The pH of the aqueous proteolytic enzyme solution was adjusted to 8.5 by adding triethanolamine and sulfuric acid to an aqueous solution of proteolytic enzyme (BIOPRASE 30 L, manufactured by Nagase ChemteX Corporation) (concentration of proteolytic enzyme: 0.5% by mass).

The sample obtained above was calendar-processed at a pressure of 30 kN using a calendar device with a combination of a metal roller and a resin roller. The calendar processing was carried out at room temperature.

The calendar-processed sample was carried into a superheated steam treatment tank at 110° C. and allowed to stand for 30 seconds for superheated steam treatment to obtain a laminated film having resin layers on both surfaces thereof. The metal components in the resin layer in the obtained laminated film constituted thin metal wires and were arranged in a mesh shape, as shown in FIG. 2. The line width of the thin metal wire was 3.7 μm and the opening ratio was 97.2%.

Examples 1 to 4 and 6 to 11, and Comparative Examples 1 to 5

An optical film and a laminated film were obtained according to the same procedure as in Example 5, except that various components in the composition for forming an adhesion-facilitating layer were changed as shown in Table 2 and various characteristics of the obtained adhesion-facilitating layer were adjusted as shown in Table 2.

The surface-treated metal oxide particles used in Comparative Example 5 were particles obtained by adding 2.5 mass of DISPERBYK 2015 (manufactured by BYK-Chemie GmbH) to zirconia particles (100 mass), followed by stirring at 5000 rpm for 1 hour using a homogenizer.

Comparative Example 6

An optical film was prepared according to the same procedure as in Example 1 of JP2016-187929A, and a laminated film was obtained according to the same procedure as in Example 5, except that the obtained optical film was used in place of the optical film 5.

Comparative Example 7

An optical film was prepared according to the same procedure as in Reference Example 7 of JP5864760B, and a laminated film was obtained according to the same procedure as in Example 5, except that the obtained optical film was used in place of the optical film 5.

The percentage of the area derived from each component in the upper region and the lower region in the vertical cross section of the adhesion-facilitating layer in the optical film obtained in each of Examples and Comparative Examples, and the arithmetic mean roughness Ra w ere measured by the methods described hereinbefore.
<Evaluation>

The following various measurements were carried out using the optical film and the laminated film obtained in each of Examples and Comparative Examples.
(Slipperiness)

Using the optical films prepared in Examples and Comparative Examples, the slipperiness was evaluated according to the following procedure.

According to the method in accordance with JIS K7125 (1999) and using a static coefficient of friction tester "Digital Force Gauge MH2-500N" (manufactured by Imada Co., Ltd), an optical film as an evaluation sample was fixed to a flat indenter (200 g, 63 mm×63 mm), and the static coefficient of friction was measured at a speed of 100 mm/min. The measurement environment was 23'C and 50% RH. The static coefficient of friction is a static coefficient of friction with respect to the surface of a stainless steel plate (SUS304) on a flat plate having a smooth surface. The test was carried out after the optical film and the stainless steel plate were brought into contact with each other for 1 minute. In the above test, the adhesion-facilitating layer in the optical film was brought into contact with the stainless steel plate. The results were evaluated according to the following standards. The results are shown in Table 1

"3": The static coefficient of friction was less than 0.25

"2": The static coefficient of friction was 0.25 or more and less than 0.30

"1": The static coefficient of friction was 0.30 or more
(Adhesiveness)

Using an NT cutter, 11 scratches were made in each of vertical and horizontal directions at intervals of 1 mm on the resin layer in the laminated film prepared in each of Examples and Comparative Examples to form 100 squares. A cellophane adhesive tape (CELLOTAPE (registered trademark) No. 405, 24 mm in width, manufactured by Nichiban Co., Ltd.) was attached on the resin layer and quickly pulled in a vertical (90°) direction to peel off. At this time, the adhesiveness was evaluated by the number of peeled squares according to the following evaluation standards. The test was carried out in an environment of 23° C. and 50% RH.
"3": No squares peeled off
"2": The number of peeled squares was 1 or more and 50 or less.
"1": The number of peeled squares was 51 or more.
(Blackness)

Using the laminated film prepared in each of Examples and Comparative Examples, a laminate was prepared in which a black polyethylene terephthalate substrate (GPH100E82A04, manufactured by Panac Co., Ltd.), a polarizing plate (HLC2-5618RE, manufactured by Sanritz Co., Ltd.), a pressure sensitive adhesive layer (8146-2, manufactured by 3M Co., Ltd), a polarizing plate (HLC2-5618RE, manufactured by Sanritz Co., Ltd.), a pressure sensitive adhesive layer (8146-2, manufactured by 3M Co., Ltd.), the above-mentioned laminated film, a pressure sensitive adhesive layer (8146-4, manufactured by 3M Co., Ltd.), and a glass substrate (EAGLE GLASS, thickness: 1.1 mm, 52 mm×75 mm, manufactured by AIGC, Inc.) were laminated in this order The laminate was imaged with a digital camera at a viewing angle of 45° from the glass substrate side of the obtained laminate under an illuminance of 400 lux, and the acquired image was gray scale-processed and evaluated with 255 gradations (255: white, 1: black) according to the following standards.
"4": It was less than 120
"3": It was 120 or more and less than 130
"2": It was 130 or more and less than 140
"1": It was 140 or more
(Migration Resistance)

Using the laminated film prepared in each of Examples and Comparative Examples, a drive durability test was carried out in which a DC voltage of 16 V was applied for 24 hours at 85° C. and 85% RH. The resistance value of the resin layer after the test was measured and evaluated according to the following standards.
"3": The resistance value was 1 MΩ or more
"2": The resistance value was as 1 kΩ or more and less than 1 MΩ
"1": The resistance value was less than 1 kΩ

In Table 1, the column "Mass percentage (%) ($PE_S$ resin/($PE_S$ resin+AC resin))" represents a mass percentage (%) of a polyester resin to a total mass of an acrylic resin, a methacrylic resin, and a polyester resin in a composition for forming an adhesion-facilitating layer.

The column "Presence/absence of surface modification" represents whether or not metal oxide particles have been subjected to a surface treatment; and it is described as "Presence" in a case where the metal oxide particles have been surface-treated, and it is described as "Absence" in a case where the metal oxide particles have not been surface-treated.

The column "Percentage (vol %)" represents a content (% by volume) of the metal oxide particles with respect to a total volume of the adhesion-facilitating layer.

The column "Mass ratio (metal oxide particles/silica particles)" represents a mass ratio of the mass of the metal oxide particles to the mass of the silica particles in the composition for forming an adhesion-facilitating layer.

The column "Arithmetic mean roughness Ra (nm)" represents an arithmetic mean roughness Ra on the surface of the adhesion-facilitating layer opposite to the substrate film side.

The column "Percentage A (%)" represents a percentage (%) of an area derived from metal oxide particles in a total area of a lower region.

The column "Percentage B (%)" represents a percentage (%) of an area derived from metal oxide particles in a total area of an upper region.

The column "A/B" represents a ratio of the percentage A to the percentage B.

The column "Percentage C (%)" represents a percentage (%) of an area derived from silica particles in the total area of the lower region. The column "Percentage D (%)" represents a percentage (%) of an area derived from silica particles in the total area of the upper region.

The column "D/C" represents a ratio of the percentage D to the percentage C.

In addition, "–" in the column "Evaluation" in the table represents that the measurement has not been carried out.

TABLE 2

| | Mass percentage (%) (PEs resin/ (PEs resin + AC resin) | Metal oxide particles (specific particles) | | | Average particle size of silica particles (nm) | Mass ratio (metal oxide particles/ silica particles) | Adhesion-facilitating layer | | |
|---|---|---|---|---|---|---|---|---|---|
| | | Type | Average particle size | Presence/ absence of surface modification | Percentage (vol %) | | | Arithmetic mean roughness Ra (nm) | Percentage A (%) | Percentage B (%) |
| Comparative Example 1 | 56 | Zirconia | 5 | Absence | 1.0 | 70 | 7.5 | 10 | 78 | 75 |
| Comparative Example 2 | 48 | Zirconia | 5 | Absence | 3.5 | 40 | 9.3 | 11 | 81 | 78 |
| Comparative Example 3 | 48 | Zirconia | 5 | Absence | 3.5 | 130 | 9.3 | 22 | 84 | 75 |
| Comparative Example 4 | 38 | Zircoma | 5 | Absence | 7.0 | 70 | 12.0 | 20 | 85 | 80 |
| Comparative Example 5 | 48 | Zirconia | 5 | Presence | 3.5 | 70 | 9.3 | 9 | 80 | 79 |
| Comparative Example 6 | Example 1 of JP2016-187929A | | | | | | | 13 | 80 | 79 |
| Comparative Example 7 | Reference Example 7 of JP5864760B | | | | | | | 25 | 85 | 84 |

TABLE 2-continued

|  | A/B | Adhesion-facilitating layer Percentage C (%) | Percentage D (%) | D/C | Refractive index | Average thickness (nm) | Evaluation Slipperiness | Adhesiveness | Blackness | Migration resistance |
|---|---|---|---|---|---|---|---|---|---|---|
| Comparative Example 1 | 1.04 | 4 | 7 | 1.8 | 1.58 | 95 | 2 | 1 | 4 | 1 |
| Comparative Example 2 | 1.04 | 5 | 6 | 1.2 | 1.58 | 95 | 1 | 3 | 4 | 3 |
| Comparative Example 3 | 1.12 | 1 | 10 | 10.0 | 1.58 | 95 | 3 | 3 | 2 | 3 |
| Comparative Example 4 | 1.06 | 3 | 8 | 2.7 | 1.58 | 95 | 3 | 3 | 2 | 3 |
| Comparative Example 5 | 1.01 | 5 | 5 | 1.0 | 1.58 | 95 | 1 | 1 | 4 | 1 |
| Comparative Example 6 | 1.01 | 5 | 6 | 1.2 | 1.51 | 50 | — | — | 1 | — |
| Comparative Example 7 | 1.01 | 5 | 6 | 1.2 | 1.58 | 89 | 3 | 3 | 1 | 2 |

|  | Mass percentage (%) (PEs resin/ (PEs resin + AC resin) | Metal oxide particles (specific particles) Type | Average particle size | Presence/ absence of surface modification | Percentage (vol %) | Average particle size of silica particles (nm) | Mass ratio (metal oxide particles/ silica particles) | Adhesion-facilitating layer Arithmetic mean roughness Ra (nm) | Percentage A (%) | Percentage B (%) |
|---|---|---|---|---|---|---|---|---|---|---|
| Example 1 | 55 | Zirconia | 5 | Absence | 2.0 | 60 | 8.5 | 12 | 80 | 75 |
| Example 2 | 55 | Zirconia | 5 | Absence | 2.0 | 100 | 8.5 | 15 | 80 | 75 |
| Example 3 | 40 | Zirconia | 5 | Absence | 6.0 | 60 | 11.0 | 17 | 86 | 77 |
| Example 4 | 40 | Zirconia | 5 | Absence | 6.0 | 100 | 11.0 | 19 | 86 | 77 |
| Example 5 | 48 | Zirconia | 5 | Absence | 3.5 | 70 | 9.3 | 18 | 82 | 77 |
| Example 6 | 4a | Zirconia | 5 | Absence | 3.5 | 70 | 9.3 | 17 | 82 | 77 |
| Example 7 | 48 | Zirconia | 5 | Absence | 3.5 | 70 | 9.3 | 16 | 83 | 76 |
| Example 8 | 48 | Zirconia | 5 | Absence | 3.5 | 70 | 9.3 | 15 | 83 | 76 |
| Example 9 | 48 | Zirconia | 5 | Absence | 3.5 | 70 | 9.3 | 13 | 83 | 76 |
| Example 10 | 48 | Zirconia | 5 | Absence | 3.5 | 70 | 9.3 | 16 | 83 | 76 |
| Example 11 | 48 | Titanium oxide | 5 | Absence | 6.0 | 70 | 9.5 | 16 | 83 | 76 |

|  | A/B | Adhesion-facilitating layer Percentage C (%) | Percentage D (%) | D/C | Refractive index | Average thickness (nm) | Evaluation Slipperiness | Adhesiveness | Blackness | Migration resistance |
|---|---|---|---|---|---|---|---|---|---|---|
| Example 1 | 1.07 | 3 | 8 | 2.7 | 1.58 | 95 | 2 | 2 | 4 | 2 |
| Example 2 | 1.07 | 3 | 8 | 2.7 | 1.58 | 95 | 3 | 2 | 4 | 2 |
| Example 3 | 1.12 | 1 | 10 | 10.0 | 1.58 | 95 | 2 | 3 | 3 | 3 |
| Example 4 | 1.12 | 1 | 10 | 10.0 | 1.58 | 95 | 3 | 3 | 3 | 3 |
| Example 5 | 1.06 | 3 | 8 | 2.7 | 1.58 | 60 | 3 | 3 | 3 | 3 |
| Example 6 | 1.06 | 3 | 8 | 2.7 | 1.58 | 80 | 3 | 3 | 3 | 3 |
| Example 7 | 1.09 | 2 | 9 | 4.5 | 1.58 | 90 | 3 | 3 | 4 | 3 |
| Example 8 | 1.09 | 2 | 9 | 4.5 | 1.58 | 100 | 3 | 3 | 4 | 3 |
| Example 9 | 1.09 | 2 | 9 | 4.5 | 1.58 | 120 | 3 | 3 | 3 | 3 |
| Example 10 | 1.09 | 2 | 9 | 4.5 | 1.58 | 95 | 3 | 3 | 4 | 3 |
| Example 11 | 1.09 | 2 | 9 | 4.5 | 1.58 | 95 | 3 | 3 | 4 | 3 |

As shown in Table 1, it was confirmed that a desired effect can be obtained by using the optical film according to the embodiment of the present invention.

From the comparison of Examples 1 and 2 with other Examples, it was confirmed that the adhesiveness and migration resistance were more excellent in a case where the percentage of the metal oxide particles was 3.0% to 6.0% by volume.

In addition, it was confirmed that the adhesiveness and migration resistance were more excellent in a case where the mass ratio (metal oxide particles/silica particles) was 9.0 to 11.0.

In addition, from the comparison of Examples 5, 6, and 9 with other Examples, it was confirmed that the blackness was more excellent in a case where the average film thickness (average thickness) was more than 80 nm and less than 120 nm.

EXPLANATION OF REFERENCES

10: optical film
12: substrate film
14: adhesion-facilitating layer
20: thin metal wire
22: lattice

What is claimed is:

1. An optical film comprising:
a substrate film; and
an adhesion-facilitating layer arranged on at least one surface of the substrate film,
wherein the adhesion-facilitating layer contains a resin, silica particles, and metal oxide particles other than the silica particles;
in a case where, in a vertical cross section of the adhesion-facilitating layer, a region to a height corresponding to 50% of an average film thickness of the adhesion-facilitating layer from a substrate film side of the adhesion-facilitating layer is defined as a lower region, and a region excluding the lower region of the adhesion-facilitating layer is defined as an upper region, a ratio of a percentage A of an area derived from the metal oxide particles in a total area of the lower region to a percentage B of an area derived from the metal oxide particles in a total area of the upper region is 1.05 or more;
the surface of the adhesion-facilitating layer opposite to the substrate film side has an arithmetic mean roughness Ra of 10 nm or more and 19 nm or less;
a mass ratio of the metal oxide particles to the silica particles is 9.0 to 11.0; and
a content of the metal oxide particles in the adhesion-facilitating layer is 3.0% to 6.0% by volume with respect to the total volume of the adhesion-facilitating layer.

2. The optical film according to claim 1,
wherein the percentage A is 80% or more.

3. The optical film according to claim 1,
wherein a percentage D of an area derived from the silica particles in a total area of the upper region is larger than a percentage C of an area derived from the silica particles in a total area of the lower region.

4. The optical film according to claim 3,
wherein a ratio of the percentage D to the percentage C is 2.0 or more.

5. The optical film according to claim 3,
wherein the percentage D is 8% or more.

6. The optical film according to claim 1,
wherein the adhesion-facilitating layer has a refractive index of 1.56 to 1.60.

7. The optical film according to claim 1,
wherein the adhesion-facilitating layer has an average film thickness of more than 80 nm and less than 120 nm.

8. The optical film according to claim 1,
wherein the metal oxide particles have an average particle size of 10 nm or less.

9. The optical film according to claim 1,
wherein a metal atom contained in the metal oxide particles is one selected from the group consisting of zirconium and titanium.

10. The optical film according to claim 1,
wherein the metal oxide particles are not subjected to a surface treatment.

11. The optical film according to claim 1,
wherein the silica particles have an average particle size of 50 to 120 nm.

12. The optical film according to claim 1,
wherein the adhesion-facilitating layer contains at least one resin selected from the group consisting of an acrylic resin, a methacrylic resin, and a polyester resin.

13. A laminated film comprising:
the optical film according to claim 1; and
a resin layer arranged on an adhesion-facilitating layer of the optical film.

14. The laminated film according to claim 13,
wherein the resin layer contains an acrylic resin or a methacrylic resin.

15. The laminated film according to claim 13,
wherein the resin layer contains a metal component.

16. The laminated film according to claim 13,
wherein the metal component constitutes a thin metal wire.

17. A touch panel comprising:
the laminated film according to claim 13.

* * * * *